Figure 1:
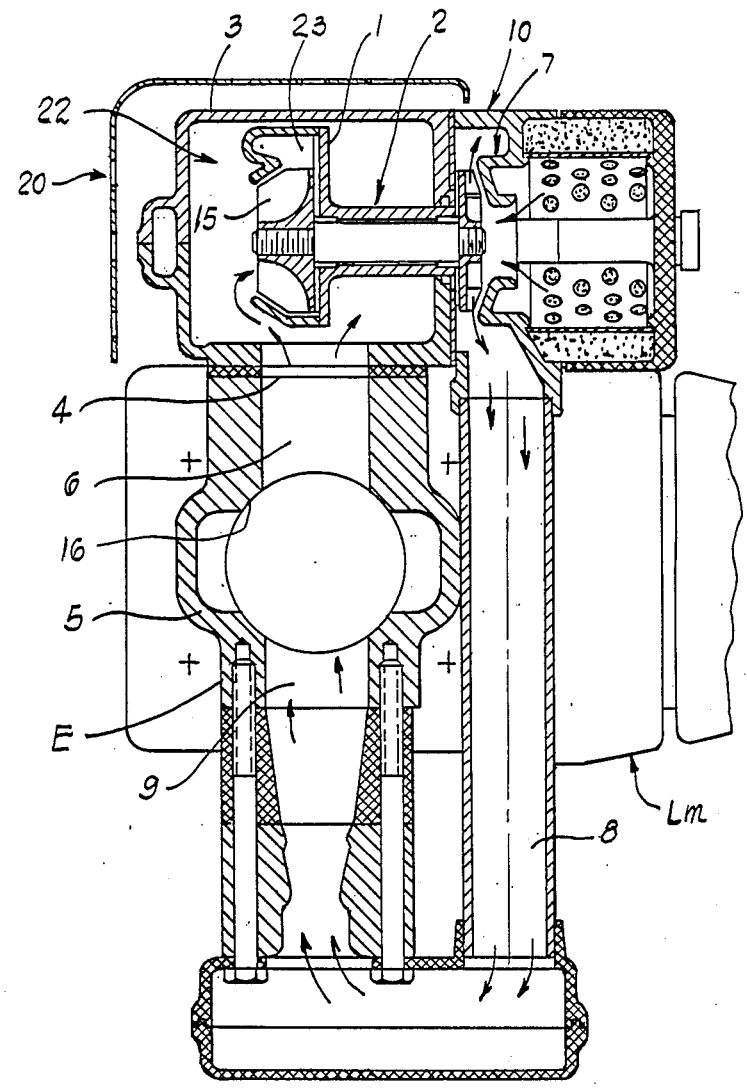

United States Patent [19]

Fischer

[11] Patent Number: 4,768,343
[45] Date of Patent: Sep. 6, 1988

[54] TWO-CYCLE TURBOCHARGED INTERNAL COMBUSTION ENGINE

[75] Inventor: Moritz Fischer, Engelberg, Switzerland

[73] Assignee: Druckgusswerk Fischer AG, Alpnach-Dorf, Switzerland

[21] Appl. No.: 917,621

[22] Filed: Oct. 10, 1986

[30] Foreign Application Priority Data

Oct. 10, 1985 [CH] Switzerland ......................... 4375/85

[51] Int. Cl.⁴ ............................................. F02B 37/00
[52] U.S. Cl. ................................... 60/605.1; 123/65 E; 123/52 M; 417/407
[58] Field of Search .................. 60/605, 599; 123/563, 123/52 H, 65 E; 417/407

[56] References Cited

U.S. PATENT DOCUMENTS 4,369,627  1/1983  Kasting et al. ....................... 60/605
4,444,013  4/1984  Inoue et al. ........................... 60/605
4,630,446  12/1986  Iwai et al. ............................ 60/605

FOREIGN PATENT DOCUMENTS 158314  9/1983  Japan .................................... 123/563

Primary Examiner—Michael Koczo
Attorney, Agent, or Firm—Watts, Hoffmann, Fisher & Heinke Co.

[57] ABSTRACT

A two-cycle internal combustion engine operated with a fuel mixture having exhaust gas turbo charging. To inhibit carbon fouling of the exhaust gas turbine, a turbine wheel housing is arranged inside the exhaust manifold. To balance the resultant heating of the turbo charger compressor, the cooling system of the engine is directed so as to cool the compressor housing and intake manifold. The intake manifold system and exhaust system are tuned to the engine so as to set up periodic vibrations which provide dynamic charging and rinsing of the cylinder.

23 Claims, 1 Drawing Sheet

TWO-CYCLE TURBOCHARGED INTERNAL COMBUSTION ENGINE

TECHNICAL FIELD

The invention relates to turbo charged two-cycle internal combustion engines and to the use of such engines.

BACKGROUND ART

In the past with chain saws, as an example, a desired increase of the drive power required an increase of the stroke volume of the drive motor. An increase in the stroke volume produces a very undesirable increase of the weight of the saw.

On the other hand, it is known that a turbo charger can produce a considerable power increase in a four cycle engine without an appreciable increase of the motor weight. Turbo charging has not been applicable, up to now, to two cycle internal combustion engines which run with a gasoline/oil mixture because the lubricant residues contained in exhaust gases would undoubtedly foul a turbo charger with carbon within a very short time and thus it would become useless in a short time.

The object of the present invention is to provide a two cycle internal combustion engine in which, despite the addition of lubricant to the fuel, the use of a turbo charger is possible without problems in operation.

Thus, problems attendant to turbo charging of a two cycle engine are solved, according to the invention by positioning the turbine wheel housing of an exhaust gas turbo charger within the exhaust system.

It is advantageous here if the turbine wheel housing is arranged within an exhaust manifold positioned to communicate directly with the exhaust port. This positioning causes the turbine and its housing to be brought to the desired operating temperature as quickly as possible. Further, it is desirable that the exhaust manifold be fastened directly to a cylinder head, directly at the outlet of an exhaust port passage running through the cylinder head.

To obtain an increased filling of the cylinder, it is also advantageous if the cooling system of the motor is designed, additionally, for the cooling of the compressor housing. It is useful here if the cooling system of the motor is designed for the cooling, additionally, of at least part of the intake manifold system extending between the compressor and the intake port of the motor.

In order to obtain a flatter torque output curve in the operating range of motors intended for chain saws, for example, it may be advantageous if the intake system is so tuned that, in the range from 30 to 10%, especially from 25 to 15%, below the motor RPM corresponding to maximum power, there takes place a dynamic rinsing or scavenging of the cylinder by means of periodic vibrations in the exhaust system.

Engines made in accordance with the present invention are useful in chain saws, lawn mowers and other two cycle engine applications especially where engine weight is an important consideration.

The invention will be explained in detail below from one example of execution represented in the drawing which is a sectioned view of a single cylinder two cycle engine as seen from a plane perpendicular to the cylinder axes.

BEST MODE FOR CARRYING OUT THE INVENTION

A two-stroke combustion engine E, provided with scavenging of the combustion chamber, represented in the drawing, is operated with a two-stroke mixture, and is used to operate a so-called lawn trimmer or mower LM.

A turbine housing 1 of a conventional exhaust gas turbo charger 2 is provided in an exhaust manifold 3. During operation, exhaust gases exit an engine cylinder 16, as indicated by the arrows of FIG. 1, and flow through an exhaust channel 6 into exhaust manifold 3. Once in the exhaust manifold 3, the flow passes through an opening 22 in the turbine housing 1 and across the turbine wheel 15 to an outlet 23. The exhaust then exits the manifold 3 via a conventional exhaust manifold outlet, not shown. The turbine housing 1 is completely inside an exhaust manifold 3, in order to assure that the entire turbine housing and its turbine wheel 15, with operation of the motor, arrive as quickly as possible at that operating temperature at which a fouling of the turbine parts with carbon is inhibited. To assist in reaching this operating temperature as quickly as possible, the exhaust manifold 3 is fastened directly to cylinder head 5, directly at outlet 4 of exhaust channel 6 running through the cylinder head 5. Expressed another way, the turbine housing 1 is in direct communication with an exhaust port defined by the intersection of an engine cylinder 16 and the exhaust channel 6.

A further advantage of positioning the turbine housing 1 in the exhaust manifold of a two-cycle engine is that the exhaust fumes, which would otherwise be very burdensome, are much more tolerable than in the past because the encapsulation of the turbine wheel 15, in the exhaust manifold 3, also provides a reduction of the fumes produced by the exhaust gas turbo charger 2.

The turbo charger 2 includes a compressor shown generally at 7 and located in a housing 10. The outlet side of the compressor 7 is connected, through an intake manifold 8, with a combustion chamber intake port 9. In this way, a two-step compression of the fuel/air mixture is obtained, namely, first through the compressor 7 and, second, in the combustion chamber.

To obtain a further increase of the filling of the cylinder, the cooling system of the motor, operating by means of a blower (not shown), is so designed the cooling air coming from this blower is directed over the compressor housing 10, and the intake manifold 8.

The intake manifold 8 is so tuned to the motor in its construction and design, that within a range from 25 to 15% below the motor RPM corresponding to maximum power, there takes place, additionally, a dynamic scavenging by means of periodic vibrations of the gas column situated in the intake manifold. In this way, in this operation range of the motor, there can be obtained in a simple manner, on the one hand, a reduced charging by the exhaust turbo charger because of reduced RPM of the motor under load, and on the other hand a better filling of the cylinder through dynamic charging, which means a flatter torque curve in the operating range of the motor, which is a great advantage in drive motors intended for chain saws.

The motor represented in the drawing has a very good power weight ratio and very well-balanced operating properties. This is of great importance, especially for use in portable operation devices.

The above-mentioned scavenging or dynamic charging may also be provided or enhanced by tuning the exhaust system 1, 3 to the motor so that within a range of 25 to 15% below the motor RPM corresponding to maximum power, there is a dynamic rinsing of the cylinder by means of periodic vibrations in the exhaust system. On closing of the exhaust port, a partial vacuum is of course provided.

In this way, the amount of residual gas remaining in the cylinder is minimal, and the intake process begins with a partial vacuum in the cylinder.

What is claimed is:

1. In combination with a two-cycle internal combustion engine and having an exhaust system, a turbo charger including a turbine wheel and housing being positioned substantially inside the exhaust system to cause exhaust gases to flow around the turbine housing during engine operation.

2. The engine according to claim 1, with the distinction that the turbine housing is arranged within an exhaust manifold.

3. An engine according to claim 2, with the distinction that the exhaust manifold is fastened directly to a cylinder head at the outlet of an exhaust channel running through the cylinder head.

4. An engine according to claim 1, with the distinction that the engine has a combustion chamber and the turbo charger has a compressor with an outlet side connected with the combustion chamber.

5. An engine according to claim 4, with the distinction that a cooling system is arranged for cooling of a housing of the compressor.

6. An engine according to claim 5, including an intake manifold system, with the distinction that the cooling system is arranged, additionally, for the cooling of at least a part of an intake manifold system extending between the compressor and an intake port of the engine.

7. An engine according to claim 1, with the distinction that it has an intake manifold system tuned to the engine such that during operation in the range of 30 to 10%, especially from 25 to 15%, below the RPM of the engine corresponding to the maximum power, there takes place a dynamic charging of the engine by means of periodic vibrations in the intake system.

8. An engine according to claim 1, with the distinction that it has an exhaust system so tuned to the engine that during operation in the range from 30 to 10%, especially from 25 to 15%, below the RPM of the engine corresponding to maximum power, there takes place, a dynamic scavenging of the cylinder by means of periodic vibrations in the exhaust system.

9. Combustion engine according to claim 1, with the distinction that the engine is a gasoline engine for use with a fuel mixture containing a lubricant.

10. Combustion engine according to claim 1, with the distinction that the engine is a diesel engine.

11. An engine according to claim 6, having an intake manifold system tuned to engine operation in the range of 30 to 10% below the RPM of the engine corresponding to the maximum power, to provide dynamic charging of the engine by means of periodic vibrations in the intake system.

12. An engine according to claim 11, having an exhaust system tuned to engine operation in the range from 30 to 10% below the RPM of the engine corresponding to maximum power, to provide dynamic rinsing of the cylinder by means of periodic vibrations in the exhaust system.

13. A two cycle internal combustion engine comprising:
   (a) structure defining a combustion chamber, the structure including a cylinder head having intake and exhaust ports;
   (b) an exhaust system connected to the cylinder head and having an exhaust channel in exhaust gas receiving communication with the exhaust port;
   (c) a turbo charger connected to the structure, the turbo charger including a turbine housing, a turbine wheel in the housing and a compressor having an outlet connected with the combustion chamber; and
   (d) the turbine housing being completely inside the exhaust system.

14. The engine of claim 13 wherein the exhaust system includes an exhaust manifold adjacent the cylinder head and wherein the turbine housing is encased in the manifold.

15. An engine according to claim 14, with the distinction that the exhaust manifold is fastened directly to the cylinder head at a cylinder head exhaust outlet.

16. An engine according to claim 13, with the distinction that a cooling system is arranged for cooling of a housing of the compressor.

17. An engine according to claim 16, including an intake manifold system, with the distinction that the cooling system is arranged, additionally, for the cooling of at least a part of an intake manifold system extending between the compressor and an intake port of the engine.

18. An engine according to claim 13, with the distinction that it has an intake manifold system tuned to the engine such that during operation in the range of 30 to 10%, especially from 25 to 15%, below the RPM of the engine corresponding to the maximum power, there takes place a dynamic charging of the engine by means of periodic vibrations in the intake system.

19. An engine according to claim 13, with the distinction that it has an exhaust system so tuned to the engine that during operation in the range from 30 to 10%, especially from 25 to 15%, below the RPM of the engine corresponding to maximum power, there takes place, a dynamic rinsing of the cylinder by means of periodic vibrations in the exhaust system.

20. An engine according to claim 6, having an intake manifold system tuned to engine operation in the range of 25 to 15% below the RPM of the engine corresponding to the maximum power, to provide a dynamic charging of the engine by periodic vibrations in the intake system.

21. An engine according to claim 20, having an exhaust system tuned to engine operation in the range from 25 to 15% below the RPM of the engine corresponding to maximum power, to provide a dynamic rinsing of the cylinder by periodic vibrations in the exhaust system.

22. An engine according to claim 11, having an exhaust system tuned to engine operation in the range from 25 to 15% below the RPM of the engine corresponding to maximum power, to provide a dynamic rinsing of the cylinder by periodic vibrations in the exhaust system.

23. An engine according to claim 12, having an exhaust system tuned to engine operation in the range from 25 to 15% below the RPM of the engine corresponding to maximum power, to provide dynamic rinsing of the cylinder by means of periodic vibrations in the exhaust system.

* * * * *